April 7, 1970        G. L. HENNESSEY        3,504,959
MULTI-SPIKE OPTICAL FILTER
Filed May 9, 1966
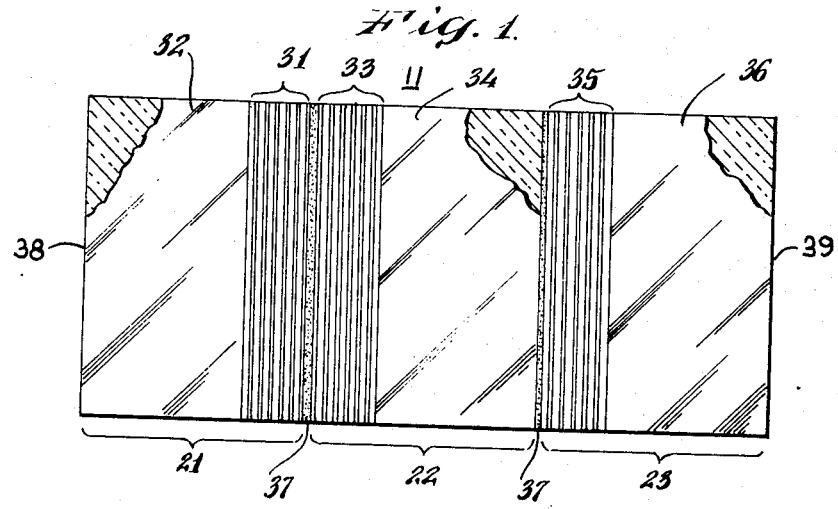
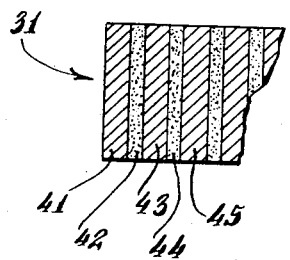 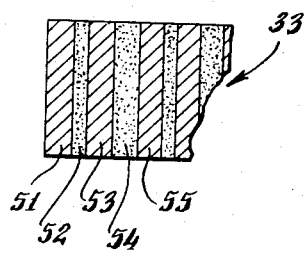 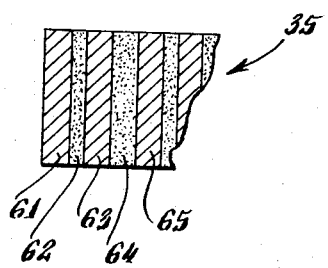
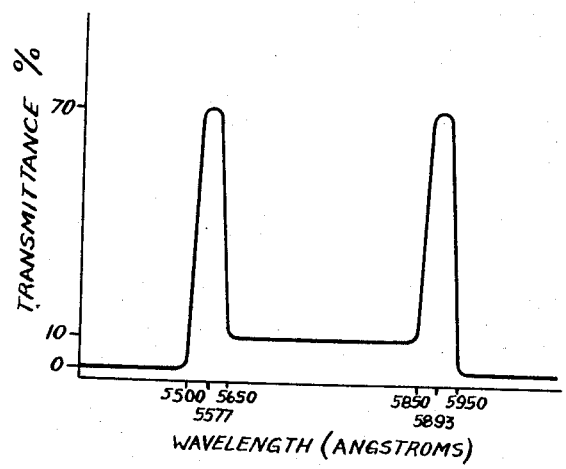
INVENTOR.
Graeme L. Hennessey
BY
Irving M. Kriegsman
ATTORNEY.

United States Patent Office 3,504,959
Patented Apr. 7, 1970

3,504,959
MULTI-SPIKE OPTICAL FILTER
Graeme L. Hennessey, Acre Lane,
Ridgefield, Conn.
Filed May 9, 1966, Ser. No. 548,581
Int. Cl. G02b 5/28, 5/20, 5/22
U.S. Cl. 350—166                        11 Claims

ABSTRACT OF THE DISCLOSURE

An optical filter for transmitting radiation at a pair of closely spaced wavelengths while rejecting radiation between the two wavelengths as well as on either side of the two wavelengths. The filter is made up of a narrow band reflector and two bandpass filters, all placed in series. The narrow band reflector rejects radiation between the two wavelengths, one of the bandpass filters rejects radiation before the shorter wavelength and the other band-pass filter rejects radiation after the longer wavelength.

---

The present invention relates to optical filters. More particularly, the present invention relates to a multi-spike optical filter.

Optical filters are well known and widely used devices for passing selected radiation wavelengths and simultaneously rejecting undesirable wavelengths.

One of the more common types of optical filters that is frequently used comprises a body of transparent colored material. The material may either be in a solid or liquid form. Another of the more common types of optical filters is the interference filter. Generally speaking, an interference filter is comprised of alternating layers of a dielectric material having a relatively high index of refraction and a dielectric material having a relatively low index of refraction. By making the layers of the proper thickness, the reflections of certain bands of wavelengths from the boundaries between the materials are reinforced and thereby removed from the transmitted beam. The other wavelengths which are grouped together in a plurality of orders of widely spaced interference or transmission bands pass through the material. These transmission bands are spaced at definite fractional parts of a reference wavelength and cannot be changed as to their relative distance from each other.

Multilayer dielectric coatings such as described above are also used in forming reflecting devices such as for example a narrow band reflector. A device of this type is highly reflective over a plurality of discrete narrow wavelength bands, referred to as reflection bands, and transmissive at other wavelengths.

A more complete understanding of interference filters and multilayer dielectric coatings may be found in U.S. Patent No. 3,151,208. Recently, the need has arisen for a new and improved optical filter which will transmit radiation simultaneously at a plurality of closely spaced selected wavelengths while at the same time reject radiation at other wavelengths. A filter of this type could be used, for example, in observing the two argon lines of high intensity which are located at 4880 angstroms (A.) and 5145 A. Another use for such a filter would be in observing the hydrogen and oxygen lines without observing other portions of the spectrum.

It is therefore an object of this invention to provide for a new and improved optical filter.

It is another object of this invention to provide for a new multilayer dielectric interference type optical filter.

It is still another object of this invention to provide for a multispike optical filter.

It is yet still another object of the present invention to provide for an interference filter which will transmit a pair of relatively closely spaced apart wavelengths and at the same time reject wavelengths in between and on either side of said pair of wavelengths.

It is another object of this invention to provide for an optical filter which will transmit highly at two narrow bands of wavelengths approximately 315 A. apart and reject all other wavelengths.

It is still another object of this invention to provide for a new two component dielectric mixture for use in multilayer interference and antireflection coatings.

It is yet still another object of this invention to provide for a new filter arrangement which will give peak transmission at a desired wavelength.

It is another object of this invention to provide for a filter arrangement which will be highly transmissive at a plurality of spaced apart wavelengths and at the same time reject other wavelengths in the surrounding portion of the spectrum.

The above and other objects are achieved in accordance with this invention by providing for a new and novel filter in which peak transmission at each of a plurality of desired wavelength bands is obtained by means of the combined effect of two independent systems, at least one of which is reflective. The systems employed are of the interference type. One of the interference systems rejects wavelengths on one side of a desired wavelength and the other interference system rejects wavelengths on the other side of said desired wavelength. The reflective type interference system is also used to reject radiation between adjacent pairs of desired wavelengths. Thus, two independent systems combine at each desired wavelength to give a sharp narrow spike or peak of maximum transmission. It should be noted that although each transmission peak is formed by two independent systems, any one independent system may form a part of two transmission peaks.

One embodiment of the present invention provides for a double spike filter by placing in series a narrow band reflector and a pair of band-pass filters. In another embodiment, a double spike filter is obtained by positioning in series a narrow band reflector and one interference filter. In still another embodiment of this invention a three-spike interference filter is obtained by placing in series two narrow band reflectors and two band-pass filters. Another feature of the invention is the provision of a new two component mixture of dielectric materials which is particularly useful as one and/or both of the layers of a multilayer dielectric coating. The new and novel mixture is obtained by mixing together in powdered form thorium oxyfluoride and zinc sulphide. This mixture is then deposited onto a suitable substrate.

Other objects and many attendant advantages of the invention will become more fully understood from the following detailed description when taken in conjunction with the accompanying drawings wherein:

FIGURE 1 is an elevation vew, partly in section and greatly enlarged for purpose of illustration, of an embodiment of a filter constructed in accordance with the invention;

FIGURES 2, 3 and 4 are section views, also greatly enlarged, or portions of the coatings of the filter in FIGURE 1;

FIGURE 5 is a chart of a curve of transmittance versus wavelength for the filter shown in FIGURE 1.

Referring now to FIGURE 1 there is shown a view of an embodiment of a filter 11 constructed in accordance with this invention. The filter 11 in this embodiment is essentially a double spike filter which is designed to give peak transmission at 5577 A. and 5893 A. and at the same time reject radiation between and on either side of said two wavelengths. It should be noted, however, that the 5577 A. line and the 5893 A. line are chosen by way of example and that a double spike filter constructed for peak transmission at other pairs of wavelengths is obviously within the scope of this invention.

Optical filter 11 is comprised of three sections 21, 22 and 23. Each of these sections 21, 22 and 23 are independent interference systems. Section 21 is essentially a narrow band reflector which is designed to give maximum rejection over a narrow band of wavelengths. In this embodiment the narrow band is in the region between the 5650 A. line and the 5850 A. line.

Section 22 is essentially a cut-on band-pass filter designed to reject all radiation up to but not including the 5577 A. line and pass all radiation up to at least the 5893 A. line.

Section 23 is essentially a cut-off band-pass filter constructed so as to transmit over a region including at least the 5577 A. line and to cut off at as close to but not before the 5893 A. line.

Thus, it can be seen that peak transmission at the 5577 A. line is obtained by means of the combined effect of the narrow band reflector 21 and the cut-on filter 22. Similarly, peak transmission at the 5893 A. line is obtained by the combined effect of a narrow band reflector 21 and cut-off filter 23. The radiation between these two wavelengths is rejected by means of the narrow band reflector 21; the radiation on the short side of the 5577 A. line is rejected by means of cut-on filter 23; and, the radiation on the long side of the 5893 A. line is rejected by means of cut-off filter 23.

Each of these interference systems 21, 22 and 23 is comprised of a multilayer dielectric coating identified by reference numerals 31, 33 and 35, respectively. The coatings 31, 33 and 35 are vacuum deposited onto a suitable substrate such as for example glass. For ease in assembling, the coatings 31, 33 and 35 are preferably deposited onto separate glass substrates 32, 34 and 36. The three interference systems 21, 22 and 23 are also preferably joined together and held by a thin layer of cement 37 or other suitable adhesive means that will not effect the transmission of energy in the pass region of the filter. The particular order of assembly is not critical, it only being necessary that the three systems be positioned along the optical path.

Referring now to FIGURE 2, there is shown a portion of the multilayer dielectric coating 31 of the narrow band reflector 21. In the illustration the width of the coatings are greatly exaggerated for ease in understanding. Multilayer dielectric coating 31 comprises a plurality of alternating layers of a high index material and a low index material. In order to obtain a sharp and narrow reflection band, it is necessary that the indices of refraction of the dielectric layers be as close as possible to each other. Accordingly, the high index layers, i.e., reference numerals 41, 43, 45, etc., comprise a mixture of thorium oxyfluoride and zinc sulphide with a combined index of refraction of 1.86. This is achieved by mixing together in powdered form the proper amounts of thorium oxyfluoride and zinc sulphide. Once the proper index of refraction is obtained, the mixture is vacuum deposited onto the substrate. The low index layers, i.e., 42, 44, etc., also comprise a mixture of thorium oxyfluoride and zinc sulphide. This mixture is also obtained by combining in a proper ratio thorium oxyfluoride and zinc sulphide in powdered form. However, in this instance the resulting mixture has an index of refraction of 1.80. Test methods, well known to a person of ordinary skill in this art, can be employed for determining the amounts of each of these materials that would be necessary to give a mixture of a desired index of refraction. In order to obtain a relatively sharp and narrow band, the second order reflection band is used. Thus, using the 8840 A. line as the reference index, the high index layers 41, 43, 45 have a thickness of half a wavelength and the low index layers 42, 44 have a thickness of approximately one-quarter of a wavelength. The total number of layers is approximately 41.

Referring now to FIGURE 3, there is shown a portion of the multilayer coating 33. This coating comprises a plurality of alternating layers of a high index material and a low index material. The dielectric material used for the high index layers 51, 53, 55, etc., is zinc sulphide having an index of refraction of approximately 2.35. Suitable aterial for use in the low index of refraction layers 52, 54, etc., is cryolite having index of refraction of approximately 1.35. Layers 51, 53, 54, 55, etc., are approximately one-quarter of a wavelength thick and layer 52 is approximately one-half of a wavelength thick. In each of these instances the reference wavelength used is approximately the 6000 A. line. The total number of layers in this coating is approximately 24.

In FIGURE 4, there is shown a portion of the multilayer coating 36 used in the cut-off filter 23, comprising a plurality of layers 61 through 65, etc. This coating is essentially the same as coating 34 except that in this instance the reference wavelength employed is approximately the 5500 A. line.

In order to reduce the reflection of light from air to glass and from glass to air, the filter is also provided with an antireflection coating at each end 38, 39. A suitable coating for a substrate of glass having an index of refraction of 1.52 comprises three films or layers of a dielectric material. The outermost layer has an index of refraction of approximately 1.68, the middle layer has an index of refraction of approximately 2.1 and the innermost layer, i.e., adjacent to the substrate, has an index of refraction of approximately 1.38. The thicknesses of the layers are one-quarter wavelength, one-half wavelength and one-quarter wavelength respectively, using 5100 A. as the reference wavelength. The material used for the outermost and middle layers comprises a two component dielectric mixture of thorium oxyfluoride and zinc sulphide. These materials are premixed in powdered form in the ratio necessary to give the desired index of refraction. The innermost layer is preferably a material such as magnesium fluoride.

Referring now to FIGURE 5, there is shown a chart of transmittance versus wavelength for double spike filter 11. As can be seen, a peak transmission of approximately 70% is achieved at the 5577 A. and 5893 A. lines while at the same time a maximum transmission of approximately 10% is achieved in the region between 5650 A. and 5850 A. lines. In addition, substantially zero transmittance occurs in the region before the 5500 A. line as well as the region on the high side of the 5893 A. line.

It is to be understood that other embodiments and many alterations and modifications may be made without departing from the spirit and scope of the invention as set forth in the appended claims.

What is claimed is:

1. An optical filter for providing peak transmission of radiation at two spaced apart wavelengths in the optical frequency portion of the electromagnetic spectrum and maximum rejection of radiation at other wavelengths in the optical frequency portion of the electromagnetic spectrum comprising:
    an optical reflector having a rejection band in the region between but not including said two wavelengths, and
    optical band-pass filter means for transmitting radiation at and between said two wavelengths while simultaneously rejecting wavelengths less than and greater than said two wavelengths.

2. An optical filter for transmitting radiation highly at two discrete spaced apart wavelengths in the optical frequency portion of the electromagnetic spectrum and simultaneously rejecting radiation between and on either side of said two wavelengths comprising:
    an optical reflector having high transmission at said two wavelengths and a reflection band extending between said two wavelengths, a first optical band-pass filter having a transmission band cutting on at the short side of the shorter wavelength and extending beyond the longer wavelengths, and a second optical band-pass filter having a transmission band including said two wavelengths and cutting off at the long side of the longer wavelength.

3. The invention according to claim 2 and wherein said optical reflector and said two optical band-pass filters are each comprised of a separate interference type multilayer dielectric coating of a high index and a low index material.

4. The invention according to claim 3 and wherein said optical reflector and said two optical band-pass filters each further include a substrate of transparent material and wherein said coatings are separately mounted onto said substrates.

5. The invention according to claim 4 and wherein said multilayer dielectric coating in said optical reflector comprises alternate layers of a mixture of thorium oxyflouride and zinc sulphide.

6. The invention according to claim 5 and wherein said optical reflector and said two optical band-pass filters are positioned in optical alignment and rigidly secured to each other.

7. The invention according to claim 6 and further including an antireflection coating deposited on each end of said optical filter.

8. A composite optical filter for transmitting radiation at two closely spaced wavelengths in the optical frequency portion of the electromagnetic spectrum while rejecting radiation at wavelengths less than, between and greater than said two closely spaced wavelengths comprising in series:

a narrow band optical reflector designed to pass radiation at wavelengths less than and greater than said two wavelengths and to reflect radiation in between said two wavelengths, and band pass optical filter means designed to reject radiation at wavelengths less than and greater than said two wavelengths and pass radiation at and between said two wavelengths.

9. The composite optical filter according to claim 8 and wherein said band-pass optical filter means comprise two optical band-pass filters, one designed to cut on at the short side of the shorter wavelength and extend beyond the longer wavelength, and the other designed to pass radiation at said two wavelengths and cut off at the long side of the longer wavelength.

10. The composite optical filter according to claim 9 and wherein the narrow band optical reflector has a reflection bandwidth of about 200 A.

11. The composite optical filter according to claim 9 and wherein the narrow band optical reflector is designed to reflect radiation between 5650 A. and 5850 A., one of the band-pass optical filters is designed to cut on at about 5577 A. and extend beyond 5893 A. and the other band pass optical filter is designed to cut on before about 5577 A. and cut off at about 5893 A.

References Cited

UNITED STATES PATENTS

| | | | |
|---|---|---|---|
| 2,392,978 | 1/1946 | Dimmick | 350—166 X |
| 2,422,954 | 6/1947 | Dimmick | 350—166 |
| 2,624,238 | 1/1953 | Widdop et al. | 350—166 X |
| 3,039,362 | 6/1962 | Dobrowolski | 350—166 |
| 3,147,132 | 9/1964 | Geffcksen. | |
| 3,185,020 | 5/1965 | Thelen | 350—164 |
| 3,279,317 | 10/1966 | Ploke | 350—166 X |

OTHER REFERENCES

Baumeister: "Notes on Multilayer Optical Filters," The Institute of Optics, University of Rochester, April 1964, pp. 20–58, 20–60.

DAVID SCHONBERG, Primary Examiner

T. H. KUSMER, Assistant Examiner

U.S. Cl. X.R.

350—316, 1; 117—33.5